United States Patent [19]

Yamamoto

[11] Patent Number: 5,652,508
[45] Date of Patent: Jul. 29, 1997

[54] ODOMETER ASSEMBLY INCORPORATING ELECTRONIC DRIVE OF SPEEDOMETER AND TACHOMETER

[75] Inventor: Hiroshi Yamamoto, Shizuoka, Japan

[73] Assignee: Yazaki Corporation, Tokyo, Japan

[21] Appl. No.: 510,620

[22] Filed: Aug. 3, 1995

[30] Foreign Application Priority Data

Aug. 4, 1994 [JP] Japan .................................. 6-183352

[51] Int. Cl.$^6$ .................. G01R 1/04; G01P 3/48; G01P 3/54
[52] U.S. Cl. .................. 324/166; 324/171; 324/156; 361/752
[58] Field of Search .................. 324/166, 171, 324/160, 115, 156; 73/488, 490; D10/70; 116/62.1; 340/459, 438, 441; 361/730, 748, 752; 307/10.1; 180/90; 296/70

[56] References Cited

U.S. PATENT DOCUMENTS 4,954,807  9/1990  Fleischer et al. .................. 340/459
5,406,303  4/1995  Salmon et al. .................. 116/DIG. 36

FOREIGN PATENT DOCUMENTS 6-167349  6/1994  Japan .

*Primary Examiner*—Sandra L. O'Shea
*Assistant Examiner*—Jay M. Patidar
*Attorney, Agent, or Firm*—Sughrue, Mion, Zinn, Macpeak & Seas

[57] ABSTRACT

A collective drive IC having a drive circuit for driving an electronic integrated distance indicator that indicates distance travelled by a vehicle is mounted on a wiring board together with the electronic integrated distance indicator. Drive circuits for driving a speedometer for indicating travel speed of the vehicle and a tachometer for indicating the number of revolutions of an engine are incorporated in the collective drive IC. The wiring board that has the collective drive IC and the electronic integrated distance indicator is accommodated in a single case to form an odometer unit. The odometer unit is releasably mounted on a meter case to which a main wiring board is fixed.

6 Claims, 6 Drawing Sheets

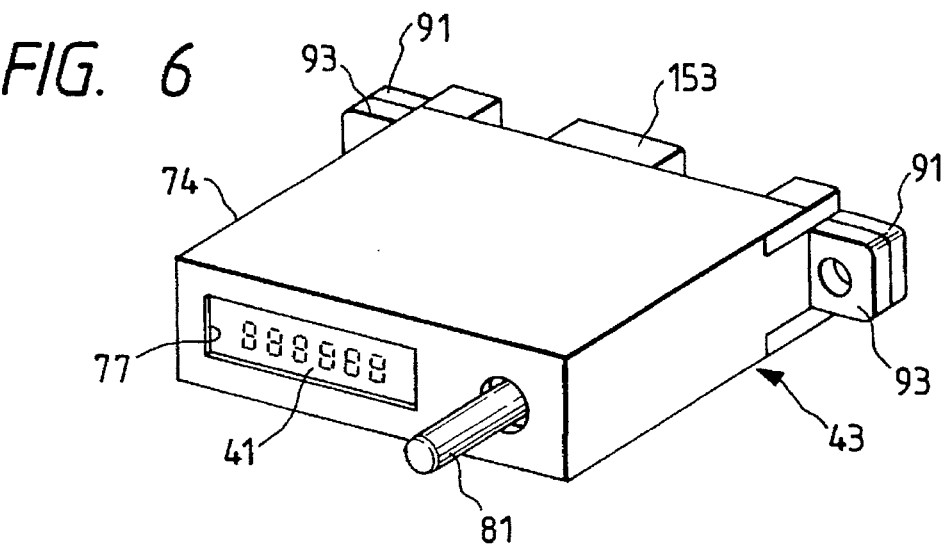
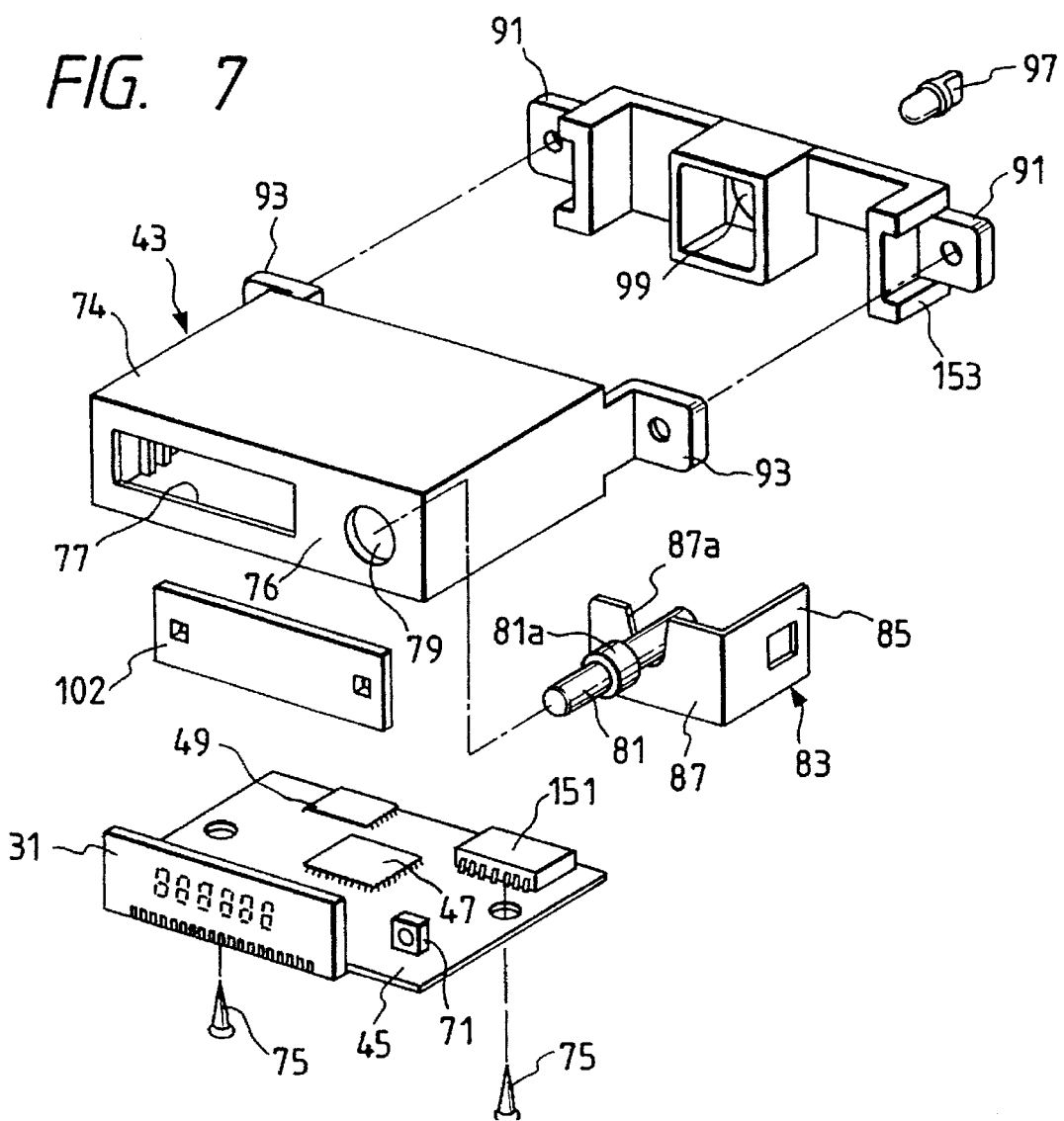

ODOMETER ASSEMBLY INCORPORATING ELECTRONIC DRIVE OF SPEEDOMETER AND TACHOMETER

BACKGROUND OF THE INVENTION

The present invention relates to an odometer unit having an electronic integrated distance indicator that indicates distance traveled by a vehicle.

Vehicles such as automobiles are equipped with a so-called combination meter in which various types of meters such as a speedometer indicating travel speed of the vehicle and a tachometer indicating the number of revolutions of an engine mounted in the vehicle. FIG. 8 is an exploded perspective view of a combination meter. A meter case 1 is designed to have a speedometer unit 3 and a tachometer unit 5 attached thereto. The speedometer unit 3 has an electronic integrated distance indicator 9 constructed of an LCD (liquid crystal display) for indicating distance traveled by the vehicle, in addition to a speedometer 7. These are mounted on a wiring board 11. The tachometer unit 5 has a tachometer 13 mounted on a wiring board 15.

The speedometer 7 and the tachometer 13 are analog meters having cross-coiled movements 17, 19, and pointers 21, 23 rotating so as to be interlocked with the magnet rotors of the movements 17, 19. In the cross-coiled movements 17, 19, the magnet rotors together with the pointers 21, 23 are rotated by magnetic field that is generated at two coils by a drive current corresponding to the speed of the vehicle or the number of revolutions and supplied to the two coils that are wound around bobbins so as to cross each other.

Electronic parts constructed of CPUs or the like for incorporating drive circuits for supplying predetermined drive current to the coils of the movements of the speedometer 7 and the tachometer 13 are mounted on the wiring boards 11, 15, respectively. Further, an electronic part for incorporating a drive circuit for the electronic integrated distance indicator 9 is also mounted on the wiring board 11 of the speedometer unit 3.

However, in such a conventional combination meter, each of the speedometer, the tachometer, and the electronic integrated distance indicator has a separate electronic part with the drive circuit, so that this design is disadvantageous not only in having to involve a large number of electronic parts but also in implementing a space-saving design.

SUMMARY OF THE INVENTION

An object of the present invention is, therefore, to reduce the number of electronic parts and thereby facilitate a space-saving design within a meter.

To achieve the above object, the invention is applied to a odometer unit characterized in that: an electronic part as well as an electronic integrated distance indicator are mounted on a wiring board, the electronic part having a drive circuit for driving the electronic integrated distance indicator indicating distance traveled by a vehicle; a drive circuit for driving an operating condition indicator is accommodated in the electronic part, the operating condition indicator indicating an operating condition of the vehicle such as a travel speed of the vehicle and being fixed to a meter case while electrically connected to main wiring board being fixed to the meter case; the wiring board having the electronic part and the electronic integrated distance indicator mounted thereon is accommodated in a single case; and the single case is releasably mounted on the meter case.

An electrically connecting terminal to be in contact with an electrically conducting portion of the wiring board is arranged on the single case, and the electrically connecting terminal comes in contact with an electrically conducting portion of the main wiring board with the single case fixed to the meter case.

The single case may have engaging pawl engageable with the meter case, or the single case may have mounting flanges to be mounted on the meter case.

According to the thus constructed odometer unit, the respective drive circuits for driving the operating condition indicators that indicate the operating conditions of a vehicle, such as a speedometer and a tachometer having cross-coiled movements, are integrated with the electronic part having a drive circuit for driving the electronic integrated distance indicator, and this electronic part is mounted on a single wiring board together with the electronic integrated distance indicator. Therefore, the object of reducing the number of electronic parts can be achieved.

Further, the electrically connecting terminal arranged in the single case comes in contact with the electrically conducting portion of the main wiring board with the odometer unit being fixed to the meter case, the odometer unit having the single case in which the wiring board is contained. Therefore, electrical connection between the wiring board and the main wiring board can be easily made.

Still further, the operation of fixing the single case to the meter case can be facilitated by taking advantage of the engaging pawls and the mounting flanges.

BRIEF DESCRIPTION OF THE DRAWINGS

FIG. 6 is a perspective view showing the appearance of an odometer unit, which is another embodiment of the invention, FIG. 7 is an exploded perspective view of the odometer unit shown in FIG. 6.

DETAILED DESCRIPTION OF THE INVENTION

Preferred embodiments of the present invention will now be described with reference to the drawings.

Figure 1:
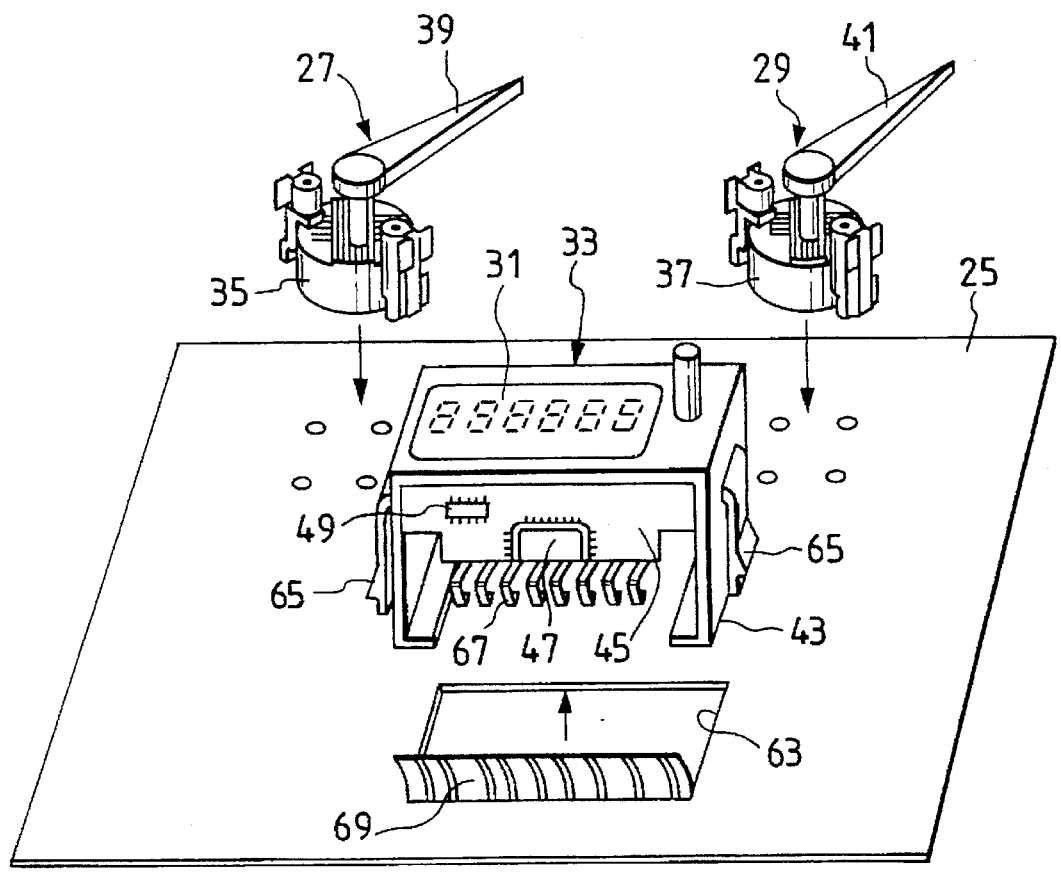
FIG. 1 is an exploded perspective view schematically showing the internal construction of a combination meter including an odometer unit, which is an embodiment of the invention.

FIG. 1 is an exploded perspective view schematically showing the internal construction of a combination meter including an odometer unit, which is an embodiment of the invention. A flexible printed circuit board (FPC) 25, which is a main wiring board, is fixed to a not shown meter case of the combination meter. An odometer unit 33 has a speedometer 27 that indicates the speed of a vehicle, a tachometer 29 that indicates the number of revolutions of an engine mounted on the vehicle, and an electronic integrated distance indicator 31 that indicates distance traveled by the vehicle by means of an LCD, and is fixed to the meter case with the speedometer, the tachometer, and the integrated distance indicator electrically connected to the FPC 25.

The speedometer 27 and the tachometer 29 constitute an operating condition indicator, and are analog meters having pointers 39, 41 that rotate so as to be interlocked with magnet rotors of cross-coiled movements 35, 37, respectively. The odometer unit 33 has a hard wiring board (HPC) 45 attached to a single case 43 through a screw, the wiring board 45 having the electronic integrated distance indicator (LCD) 31 mounted thereon.

Mounted on the wiring board 45 are a collective drive IC 47 and a nonvolatile memory IC 49 as electronic parts, the collective drive IC 47 serving to collectively drive the three meters and incorporating the drive circuits of the speedometer 27 and the tachometer 29, in addition to a drive circuit for driving the electronic integrated distance indicator 31. The nonvolatile memory IC 49 in this embodiment is an EEPROM that stores two kinds of integrated distance values, an integrated value of distance traveled as an odometer and an integrated value of distance traveled as a trip meter.

Figure 2:
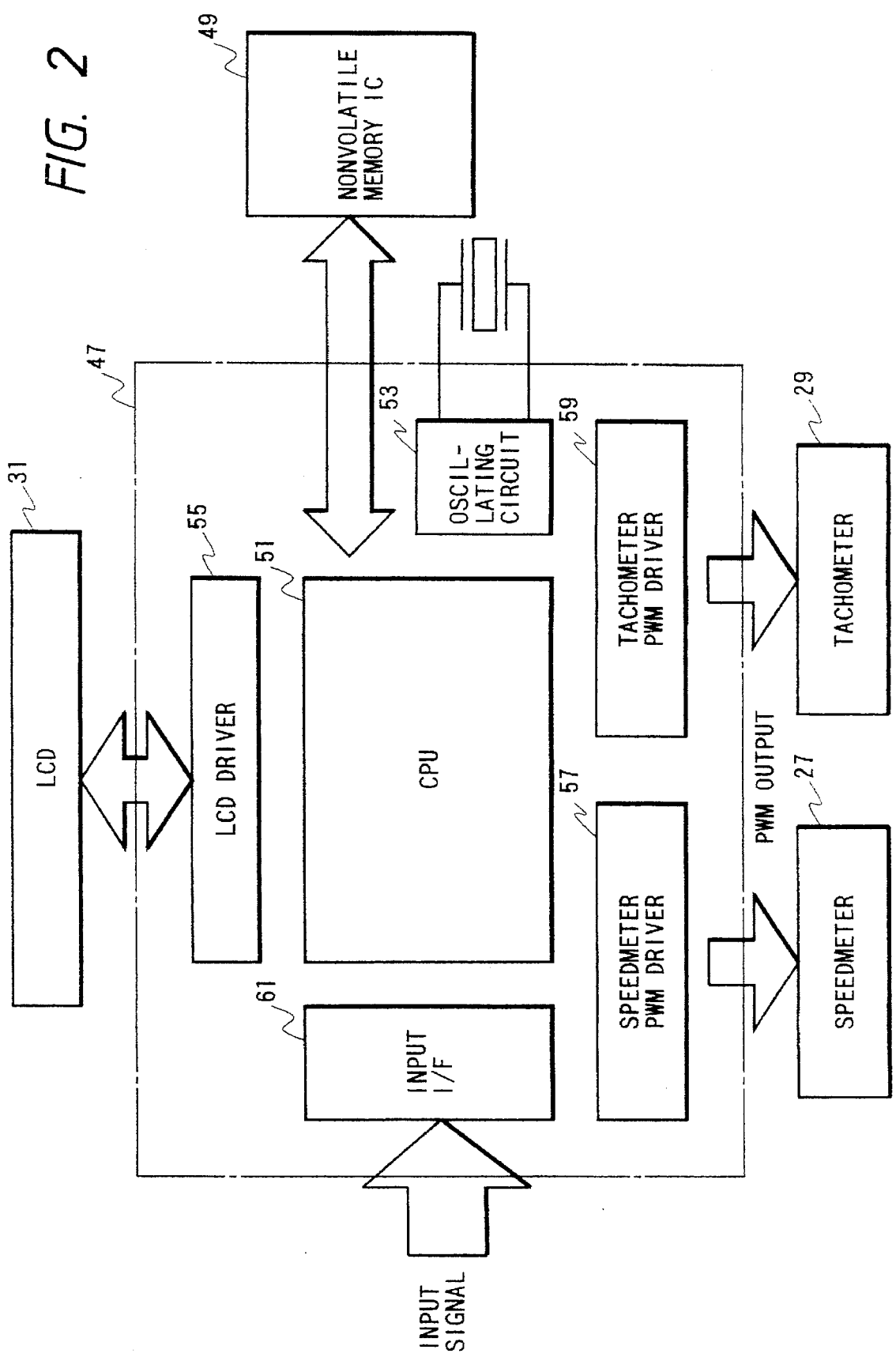
FIG. 2 is a block diagram showing the electric circuit of the odometer unit shown in FIG. 1.

FIG. 2 is a block diagram showing electric circuits highlighting the collective drive IC 47. The collective drive IC 47 is a microcomputer constructed of a single chip IC, and includes: a CPU 51; an oscillating circuit 53 for driving the CPU 51; an LCD driver 55 for driving the electronic integrated distance indicator (LCD) 31; a speedometer PWM driver 57 and a tachometer PWM driver 59 having pulse width modulating circuits for driving the movements 35, 37 of the speedometer 27 and the tachometer 39, respectively; and an input interface 61 for receiving a distance signal, a speed signal, and a revolution signal from not shown sensors and converting these signals into signals that can be processed by the CPU 51.

The CPU 51 outputs drive signals to the LCD driver 55, the speedometer PWM driver 57, and the tachometer PWM driver 59 based on signals outputted from the input interface 61 in accordance with a program stored in a built-in ROM.

The odometer unit 33 that includes the wiring board 45 having the collective drive IC 47 mounted thereon is inserted into a mounting hole 63 formed in the FPC 25 from below as viewed in FIG. 1, and fixed with engaging pawls 65 arranged on both the right and left sides of the case 43 with engaging recesses of the not shown meter case. Here the odometer unit 33 has contact pins 67 serving as an electrically connecting terminal that come in contact with an electrically conducting portion on the wiring board 45. On the other hand, an electrically conducting portion 69 is provided at a peripheral edge of the mounting hole 63, so that the contact pins 67 are in contact with the electrically conducting portion 69 with the odometer unit 33 being fixed to the meter case through the engaging pawls 65. As a result of the contact made by the contact pins 67 between the electrically conducting portion on the side of the wiring board 45 and the electrically conducting portion 69 on the side of the FPC 25, the speedometer and tachometer drive signals outputted from the collective drive IC 47 on the side of the wiring board 45 can be transmitted to the movements 35, 37 on the side of the FPC 25.

In the thus constructed odometer unit, when signals corresponding to the distance signal, the speed signal, and the revolution signal inputted to the input interface 61 are received by the CPU 51, the CPU 51 outputs drive signals to the LCD driver 55, the speedometer PWM driver 57, and the tachometer PWM driver 59 to thereby drive the electronic integrated distance indicator (LCD) 31, the speedometer 27, and the tachometer 29, respectively.

An IC, which is a single chip electronic part, is used to form the collective drive IC 47 incorporating the CPU 51, the LCD driver 55, the speedometer PWM driver 57, the tachometer PWM driver 59, and the like as a drive circuit for driving the electronic integrated distance indicator (LCD) 31, the speedometer 27, and the tachometer 29. As a result of this design, the number of electronic parts is reduced compared with the conventional example involving electronic parts with drive circuits for the respective meters, which in turn permits a space-saving design within the combination meter.

Further, the odometer unit 33 is fixed while engaging the engaging pawls 65 with the single case 43, and since the contact pins 67 on the side of the wiring board 45 come in contact with the electrically conducting portion 69 of the FPC 25 on the side of the meter case during the fixing operation, the electric contact between the wiring board 45 and the FPC 25 is easily established, which in turn contributes to improving not only the assembling operability of the meter as a whole but also maintenance.

The wiring board 45 contained within the odometer unit 33 is shared with the three meters, namely, the electronic integrated distance indicator 31, the speedometer 27, and the tachometer 29, and this contributes to a cost reduction.

Figure 3:
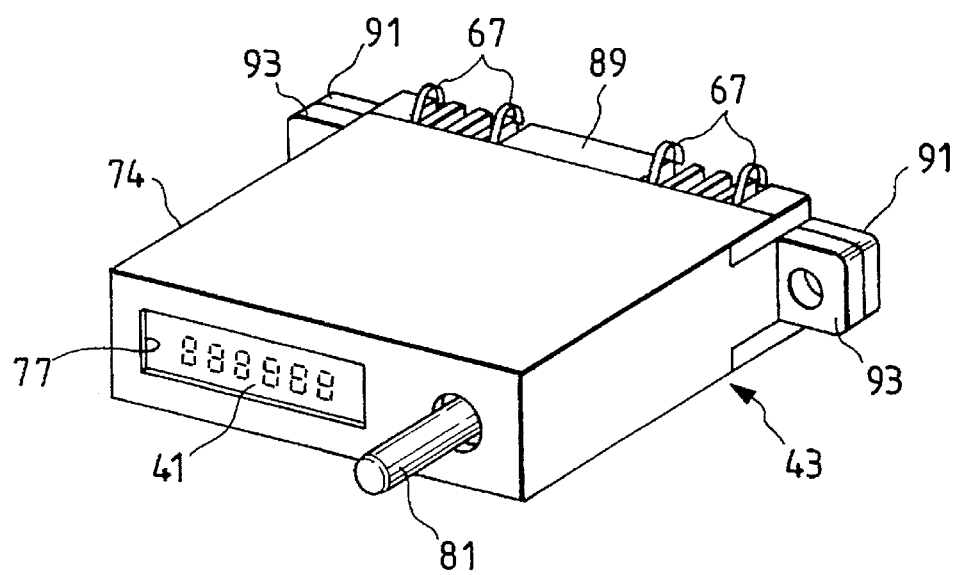
FIG. 3 is a perspective view showing the specific external construction of the odometer unit shown in FIG. 1.
Figure 4:
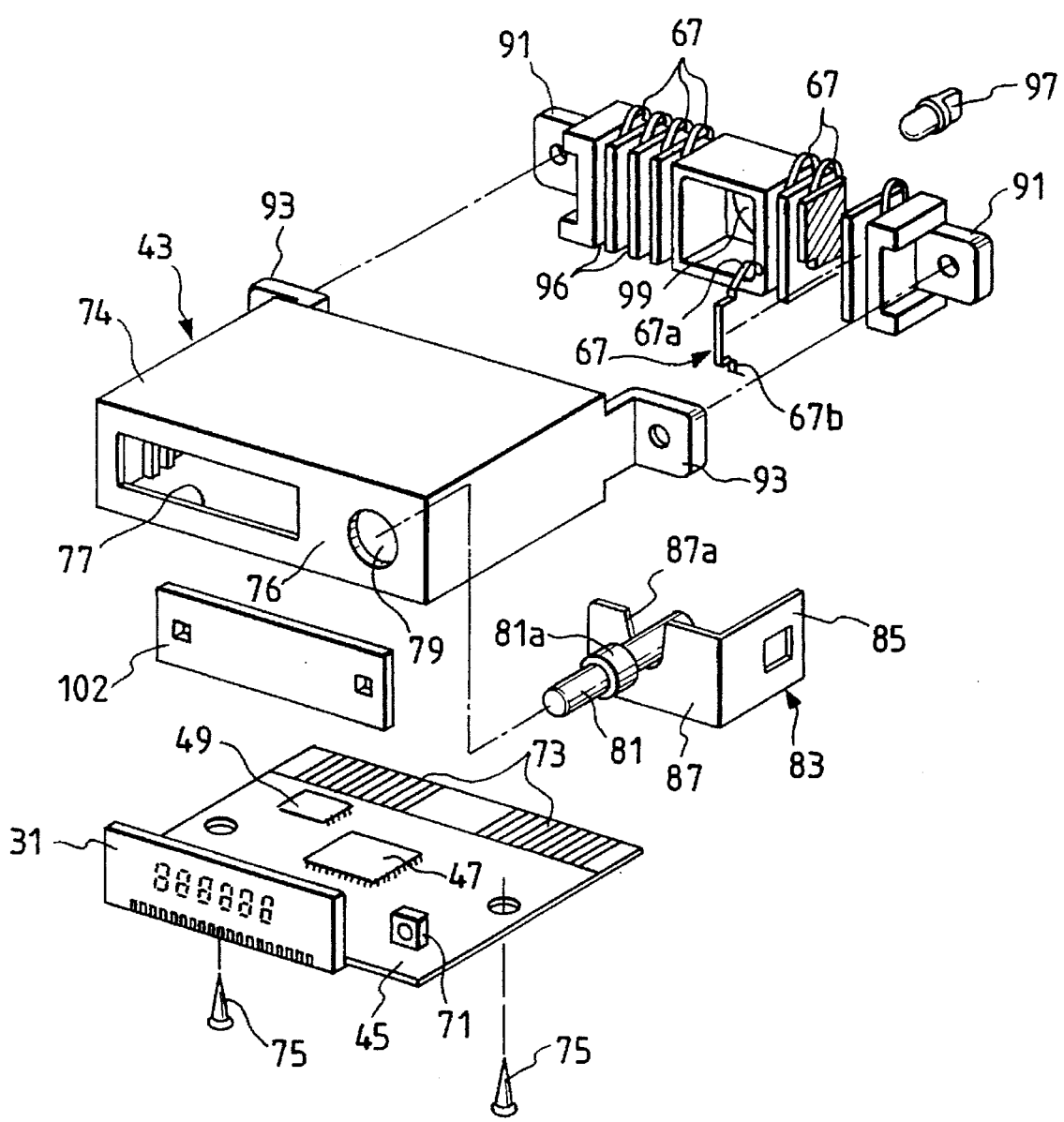
FIG. 4 is an exploded perspective view showing the odometer unit shown in FIG. 3.
Figure 5:
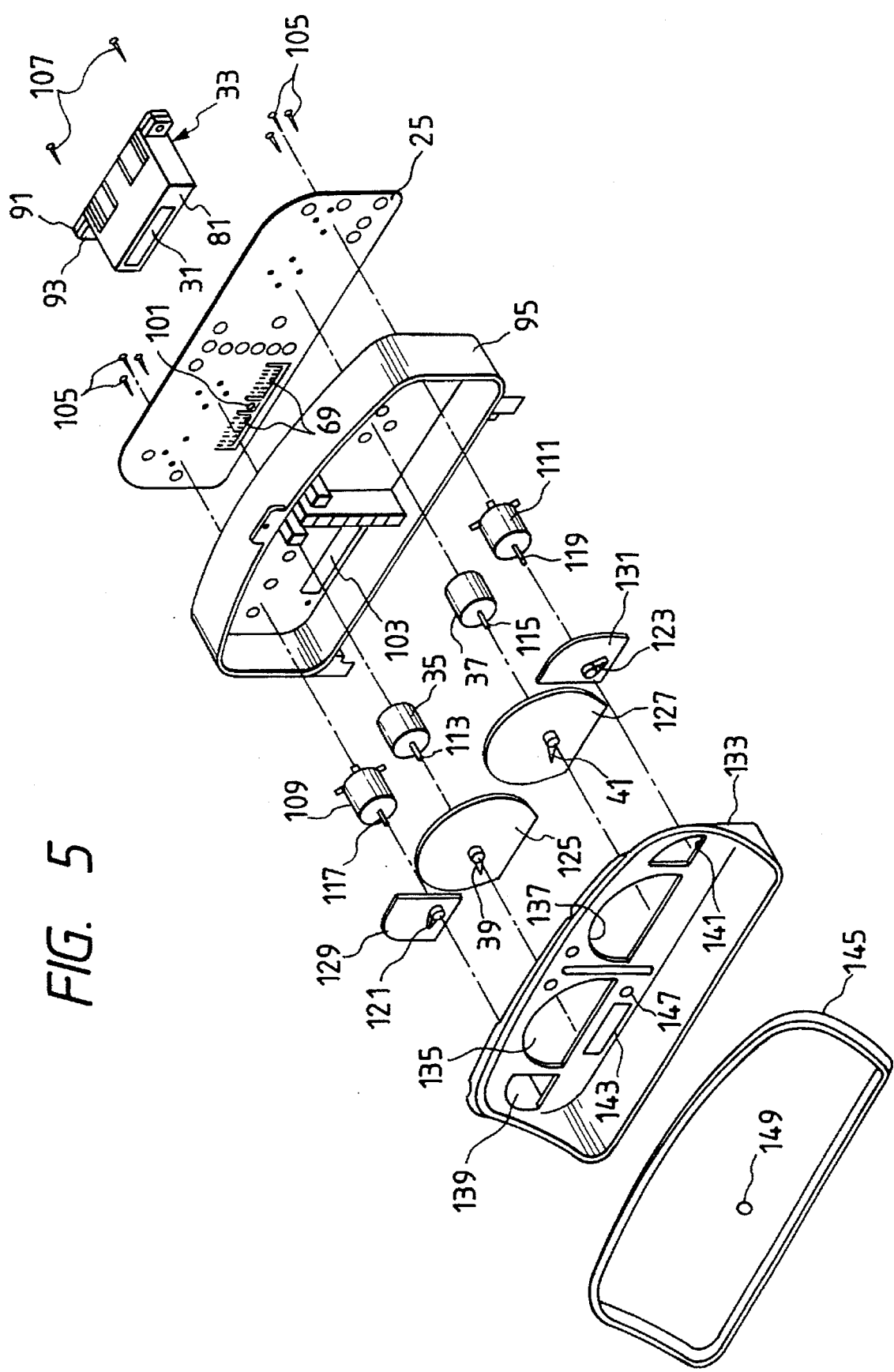
FIG. 5 is an exploded perspective view showing the entire part of the combination meter to which the odometer unit shown in FIG. 3 is assembled.
Figure 8:
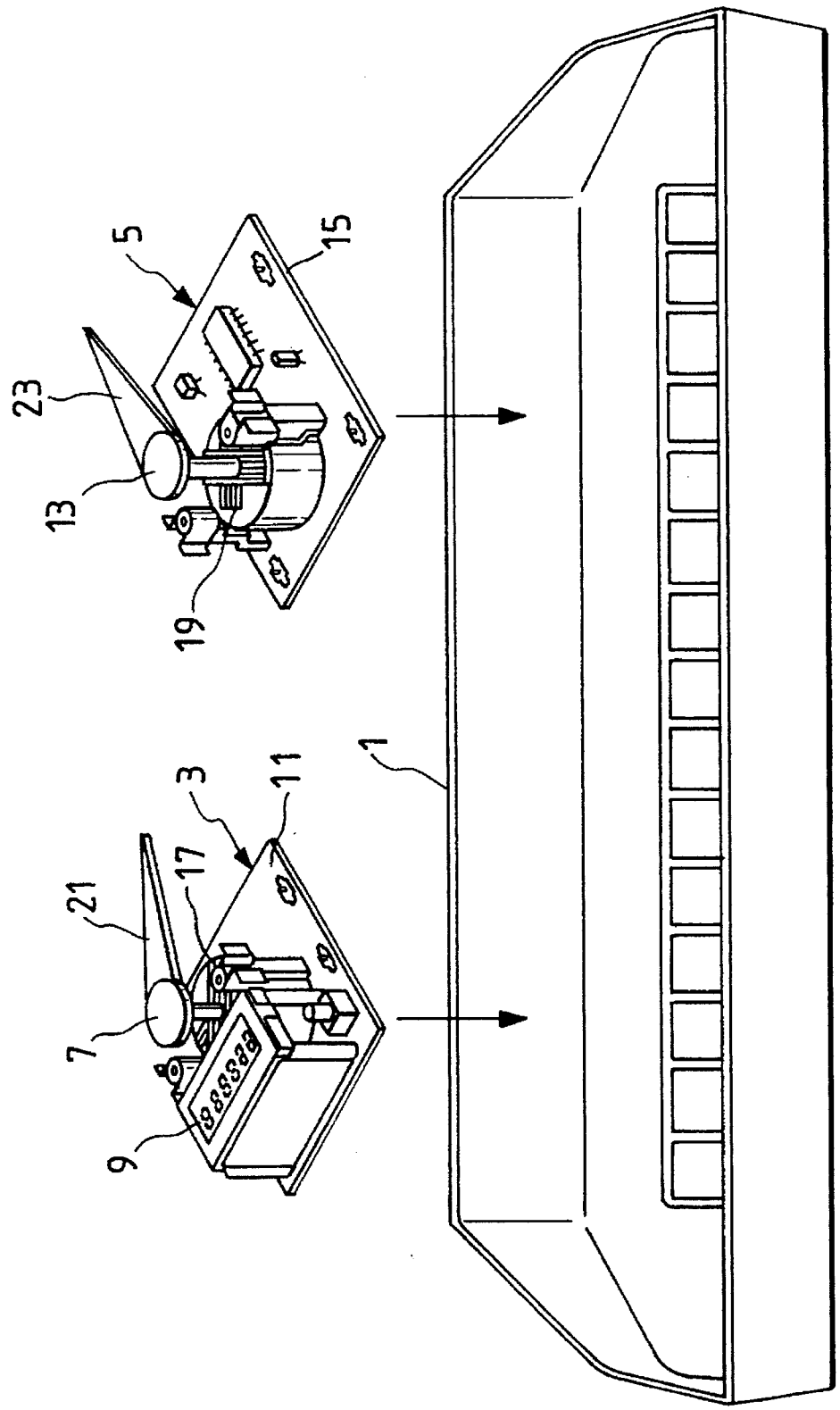
FIG. 8 is an exploded perspective view of a conventional combination meter.

FIG. 3 is a perspective view showing the specific external construction of the odometer unit 33. FIG. 4 is an exploded perspective view showing the odometer unit 33. FIG. 5 is an exploded perspective view showing the entire part of the combination meter to which the odometer unit 33 is assembled. Not only the electronic integrated distance indicator 31 is mounted on the front end of the wiring board 45 so as to be perpendicular to the wiring board 45, but also the collective drive IC 47 and the nonvolatile memory IC 49 are mounted, and a changeover switch 71 for changing the indication in the electronic integrated distance indicator 31 (between the odometer and the trip meter, and for reset in the trip meter) is mounted. Further, an electrically conducting portions 73 that come in contact with the contact pins 67 with the wiring board 45 assembled as shown in FIG. 3, is provided on the rear end of the wiring board 45.

The single case 43 is such that the entire part of the bottom of a case main body 74 is opened, and the wiring board 45 is set to the case 43 from the side of the opening and fixed by tapping screws 75. With the wiring board 45 fixed to the case 43, the electronic integrated distance indicator 31 is aligned with a rectangular opening 77 formed in the front 76 of the case main body 74.

A circular opening 79 is formed in the side of the opening 77 on the front 76 of the case main body 74. The front end of a knob 81 that can be operated so that the rear end thereof comes in contact with the switch 71 on the wiring board 45, is projected from this opening 79. A plate spring 83 is fixed to a portion of the case main body 74 at which the knob 81 is arranged. The plate spring 83 serves to return the knob 81 from the state in which the rear end of the knob 81 has been brought into contact with the switch 71 by pressing the knob 81 from the front end thereof. The plate spring 83 is L-shaped in cross section. One surface 85 of the plate spring 83 is fixed to the inner wall of the case main body 74 and the other surface 87 has a U-shaped notch 87a so that the knob 81 is inserted into the notch 87a. A large diameter portion 81a is formed on the knob 81 at the position between the front 76 of the case main body 74 and the surface 87 of the plate spring 83 so that this large diameter portion 81a presses the surface 87 of the plate spring 83.

The case main body 74 has the entire part of the rear end side thereof also opened, and a back case 89 serving as a terminal case is arranged at this opening. Mounting flanges 91 are provided at both ends of the back case 89. Similarly, mounting flanges 93 are provided in the case main body 74. The odometer unit 33 is attached to a meter case 95 (to be described later with reference to FIG. 5 and sometimes referred to as an instrument panel enclosure) through these flanges 91, 93.

A plurality of grooves 96 are formed in the back case 89 at positions excluding the middle. The contact pins 67 are fitted into these grooves 96. The upper ends 67a and lower ends 67b of the contact pins 67 project from the upper and lower surfaces of the back case 89. The lower ends 67b of the contact pins 67 are in resilient contact with the electrically conducting portions 73 of the wiring board 45 at all times with the odometer unit 33 assembled as shown in FIG. 3, and the upper ends 67a thereof come in resilient contact with the electric conducting portion 69 of the FPC 25 with the odometer unit 33 assembled to the meter case 95.

An insertion hole 99 that allows a bulb 97 to be inserted thereinto, is formed in the middle of the back case 89, the bulb serving to provide the electronic integrated distance indicator (LCD) 31 with backlight. The bulb 97 is fixed to a bulb mounting portion 101 (see FIG. 5) formed in the middle of the electrically conducting portion 69 of the FPC 25 while inserted into the insertion hole 99. Further, a diffusing plate 102 is disposed on the rear of the electronic integrated distance indicator (LCD) 31 within the case main body 74, so that the light from the bulb 97 can be projected uniformly over the entire part of the electronic integrated distance indicator (LCD) 31.

Next, the construction of the entire part of the combination meter will be described with reference to FIG. 5. A rectangular through hole 103 is formed in the meter case 95 at a position confronting the electrically conducting portion 69 of the FPC 25 and the bulb mounting portion 101. The FPC 25 is fixed to the back of the meter case 95 by screws 105 with the electrically conducting portion 69 of the FPC 25 and the bulb mounting portion 101 aligned with this through hole 103.

The electrically conducting portion 69 and the bulb mounting portion 101 are cut apart from the main body of the FPC 25 at the lower ends and both sides thereof, respectively, and only the upper ends thereof are connected to the main body of the FPC 25. As a result of this design, the odometer unit 33 can be mounted on the meter case 95 by inserting into the through hole 103 the odometer unit 33 while pushing the electrically conducting portion 69 of the FPC 25 and the bulb mounting portion 101 out of the way, and then fixing the odometer unit 33 with screws 107 through the mounting flanges 91, 93. Under this condition, the electrically conducting portion 69 comes in contact with the contact pins 67 while positioned on the upper end of the odometer unit 33. On the other hand, the bulb mounting portion 101 is pulled rearward to be placed behind the odometer unit 33, so that the bulb mounting portion 101 is aligned with the insertion hole 99 of the back case 89.

The movements 35, 37 of the speedometer 27 and the tachometer 29 as well as the cross-coiled movements 109, 111 of a fuel indicator and a thermometer, are fixed to a surface opposite to the FPC 25 of the meter case 95 with not shown screws screwed in from the back of the FPC 25. If electrically conducting screws are employed, electric conduction can be established between the electrically conducting portion connected to the coils of the respective movements 35, 37, 109, 111 and the electrically conducting portion on the side of the FPC 25.

The respective movements 37, 39, 109, 111 have pointer shafts 113, 115, 117, 119 fixed to the respective magnet rotors, and pointers 39, 41, 121, 123 fixed to the front ends of the pointer shafts 113, 115, 117, 119, respectively. Dial plates 125, 127, 129, 131 are attached to the meter case 95 from the front using not shown screws with the pointer shafts 113, 115, 117, 119 passing through the dial plates.

A facing 133 is mounted on the front of the meter case 95. the facing 133 has openings 135, 137, 139, 141 aligned with the dial plates 125, 127, 129, 131 and an opening 143 aligned with the display surface of the electronic integrated distance indicator (LCD) 31. A front glass 145 is mounted in front of the facing 133. The facing 133 and the front glass 145 have circular through holes 147, 149, so that the knob 81 of the odometer unit 33 is inserted into these through holes 147, 149 so as to be projected from the front glass 145.

FIGS. 6 and 7 are exploded perspective views showing another exemplary odometer unit. This odometer unit 43 is characterized as arranging a connector 151 instead of the contact pins on the rear end of the wiring board 45 so as to establish electric conduction between the wiring board 45 and the FPC 25. In this case, a connecting section made of, e.g., a flat cable to be connected to the connector 151 is arranged on the side of the FPC 25, and this connecting section is connected to the connector 151 while inserted from the rear of the connector 151. Further, a back case 153 is to be mounted at an opening on the rear side of the case main body 74, the back case 153 serving as a bulb case. Other constructional aspects are similar to those shown in FIGS. 3 and 4.

While the odometer unit 33 shown in FIGS. 3, 4, and 6, 7 is of the structure that the odometer unit 33 is fixed to the meter case 95 with the screws, such a structure as shown in FIG. 1, in which the engaging pawls 65 are provided on both sides of the case main body 74 and the engaging recesses engageable with the engaging pawls 65 are provided on the meter case 95 to fix both members 74 and 95 to each other, may be adopted, so that the fixing operation can be made easier.

Further, while the tachometer 29 is provided in the aforementioned embodiments, the invention may be applicable to those without the tachometer 29. Still further, by integrating the drive circuits for driving the movements 109, 111 of the fuel indicator and the thermometer into the collective drive IC 47, the number of electronic parts can be further reduced to contribute to implementing a space-saving design within the meter.

As described in the foregoing, the invention is characterized as integrating drive circuits for driving operating condition indicators for indicating the operating conditions of a vehicle, e.g., a speedometer and a tachometer, into an electronic part having a drive circuit for driving an electronic integrated distance indicator, and mounting this electronic part on a single wiring board. Therefore, not only the number of electronic parts can be reduced, but also a cost reduction can be achieved with only one wiring board used. Further, the invention is effective in implementing a space-saving design.

The invention is also characterized in that when the odometer unit is fixed to the meter case, the electrically connecting terminal on the side of the odometer unit is electrically conducted with the electrically conducting portion of the main wiring board on the side of the meter case. Therefore, the wiring board can be electrically connected to the main wiring board more easily.

Still further, the operation of fixing the odometer unit to the meter case is facilitated by utilizing the engaging pawls or the mounting flanges mounted on the single case.

What is claimed is:

1. An odometer unit, comprising:

a wiring board;

an electronic integrated distance indicator mounted on said wiring board for indicating distance traveled by a vehicle;

an electronic part mounted on said wiring board and receiving information regarding the driving condition of the vehicle, said electronic part including a first drive circuit for driving said electronic integrated distance indicator according to said information;

a single case accommodating said wiring board having said electronic part and said electronic integrated distance indicator mounted thereon, said single case being releasably mounted on a main wiring board so as to protrude through an opening in said main wiring board, said main wiring board being mounted inside an instrument panel enclosure;

wherein said electronic part includes a second drive circuit for driving an operating condition indicator according to said information, said operating condition indicator indicating an operating condition of said vehicle and being fixed to said instrument panel enclosure while electrically connected to the main wiring board, said main wiring board providing electrical connection between said second drive circuit and said operating condition indicator.

2. An odometer unit according to claim 1, wherein said wiring board includes an electrically conducting portion;

wherein said single case includes an electrically connecting elastic terminal to be in resilient contact with said electrically conducting portion of said wiring board; and wherein said electrically connecting elastic terminal comes in resilient contact with an electrically conducting portion of said main wiring board when said single case is fixed to said instrument panel enclosure.

3. An odometer unit according to claim 2, wherein said single case includes an engaging pawl engageable with said main wiring board.

4. An odometer unit according to claim 2, wherein said single case includes a mounting flange to be mounted on said main wiring board.

5. An odometer unit according to claim 1, wherein said wiring board includes a connector to be electrically connected to a connecting terminal of said main wiring board so as to facilitate said electrical connection between said second drive circuit and said operating condition indicator.

6. An odometer unit according to claim 1, wherein said operating condition indicator is one of a speedmeter, a tachometer, a fuel indicator and a thermometer.

* * * * *